United States Patent
Kato

(10) Patent No.: US 6,397,997 B2
(45) Date of Patent: Jun. 4, 2002

(54) FRICTION ENGAGING DEVICE

(75) Inventor: Masanori Kato, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/727,762

(22) Filed: Dec. 4, 2000

(30) Foreign Application Priority Data

Dec. 6, 1999 (JP) ............................................. 11-346248

(51) Int. Cl.⁷ .......................... F16D 13/52; F16D 13/64
(52) U.S. Cl. ................................. 192/70.14; 192/107 R
(58) Field of Search ........................... 192/70.12, 70.14, 192/70.2, 107 R, 113.1, 113.21; 188/71.5

(56) References Cited

U.S. PATENT DOCUMENTS 5,913,395 A * 6/1999 Takakura et al. ......... 192/70.14
5,975,267 A * 11/1999 Takakura et al. ........ 192/107 R
6,135,256 A * 10/2000 Han et al. ................. 192/70.14

FOREIGN PATENT DOCUMENTS

JP          59-26632 A    *  2/1984

* cited by examiner

Primary Examiner—Rodney H. Bonck
(74) Attorney, Agent, or Firm—Armstrong, Westerman & Hattori, LLP

(57) ABSTRACT

The friction materials interposed between the respective externally toothed discs $3_1$, $3_2$, $3_3$ and the respective internally toothed discs $4_1$, $4_2$, $4_3$ which are located contiguously to one sides of the respective externally toothed discs $3_1$, $3_2$, $3_3$ in an axial direction are each divided into a radially outer half portion 9a and a radially inner half portion 9b. The half portion 9b is attached to a thin recessed surface portion 3c formed on a radially inner side of the one side of each of the externally toothed portions $3_1$, $3_2$, $3_3$ in the axial direction. However, the half portion 9a is attached to a thin recessed surface portion 4c formed on a radially outer side of the other side of each of the respective internally toothed discs $4_1$, $4_2$, $4_3$ in the axial direction.

2 Claims, 3 Drawing Sheets

FRICTION ENGAGING DEVICE

BACKGROUND OF THE INVENTION

1. Field of the Invention

The present invention relates to a friction engaging device such as a clutch or a brake that is incorporated in an automotive automatic transmission.

2. Description of the Related Prior Art

A friction engaging device comprises externally toothed discs each having outer circumferential teeth adapted to spline engage an outer member and internally toothed discs each having inner circumferential teeth adapted to spline engage an inner member, wherein the externally toothed discs and the internally toothed discs are brought into press contact with each other in an axial direction via friction materials for torque transfer between the outer member and the inner member.

In friction engaging devices as descried above, there are a double-side application type and a single-side application type. In the double-side application type, a first friction material adapted to be interposed between an externally toothed disc and an internally toothed disc that is located contiguously on one side of the externally toothed disc in an axial direction is attached to the other side of the internally toothed disc in the axial direction, whereas a second friction material adapted to be interposed between an internally toothed disc and an externally toothed disc that is located contiguously on one side of the internally toothed disc in the axial direction is attached to one side of the internally toothed disc in the axial direction. On the other hand, in the single-side application type, first and second friction materials are attached to one side of an externally toothed disc in the axial direction and one side of an internally toothed disc in the axial direction, respectively (refer to Japanese Patent Unexamined Publication No. Hei.10-78051).

In the double-side application type of friction engaging device, the sides of the externally toothed disc constitute friction surfaces for the first and second friction materials, and friction heat generated in the first and second friction materials is then introduced into the externally toothed disc from the sides thereof. This eventually increases the heat that is to be introduced into the externally toothed disc, and as a countermeasures against the heat so introduced, the externally toothed disc needs to be thicker to increase the heat capacity thereof, and as a result thereof, the axial length of the friction engaging device has to be made longer. On the other hand, in the single-side application type of friction engaging device, friction heat generated in the first and second friction materials is introduced into the externally and internally toothed discs in a dispersed fashion. Due to this construction, the respective discs do not need to be made thicker, and the axial length of the friction engaging device can be made shorter, whereby the friction engaging device can be made smaller in size and lighter in weight.

As described above, with the single-side application, although the thickness of the respective discs does not have to be made thicker, with a view to securing the strength of the outer circumferential teeth of the externally toothed discs and the inner circumferential teeth of the internally toothed discs, the thickness of the respective discs cannot be reduced beyond a predetermined limit, and this causes a problem in attempting to make the friction engaging device further smaller in size and lighter in weight.

The present invention was made in view of the above drawback inherent in the prior art friction devices, and an object thereof is to provide a friction engaging device which can be made further smaller in size and lighter in weight.

SUMMARY OF THE INVENTION

With a view to solving the aforesaid problem, according to a first aspect of the invention, there is provided a friction engaging device comprising externally toothed discs each having outer circumferential teeth adapted to be spline engaged with an outer member and internally toothed discs each having inner circumferential teeth adapted to be spline engaged with an inner member, wherein the externally toothed discs and the internally toothed discs are brought into axial press contact with each other via friction materials for performing the transfer of a torque between the outer member and said inner member, the friction engaging device being characterized in that one side face of each of the externally toothed discs in an axial direction is formed into a stepped surface having a raised surface portion on a radially outer side of the disc and a recessed surface portion on a radially inner side thereof by making a radially inner half portion of each of the externally toothed discs thinner than a radially outer half portion thereof, that the other side face of each of the internally toothed discs in an axial direction which is located contiguously to the one side of each of the externally toothed discs in the axial direction is formed into a stepped surface having a raised surface portion on a radially inner side of the disc and a recessed surface portion on a radially outer side thereof by making a radially outer half portion of each of the internally toothed discs thinner than a radially inner side half portion thereof, and that first friction materials interposed between the externally toothed discs and the internally toothed discs that are located contiguously to the one side of the externally toothed discs in the axial direction are each divided into a radially outer half portion and a radially inner half portion, the radially inner half portion of the first friction material being attached to the recessed surface portion on the one side of each of the externally toothed discs in the axial direction or the raised surface portion on the other side of each of the internally toothed discs in the axial direction, the radially outer half portion of the first friction material being attached to the recessed surface portion on the other side of each of the internally toothed discs in the axial direction or the raised surface portion on the one side of each of the externally toothed discs in the axial direction.

According to the first aspect of the invention, the thicknesses of the radially outer half portion of the externally toothed discs and the radially inner half portion of the internally toothed discs are made so sufficient to secure a required strength for the outer circumferential teeth of the externally toothed discs and for the inner circumferential teeth of the internally toothed discs, and on the other hand, the thicknesses of the radially inner half portion of each of the internally toothed discs corresponding to the radially inner half portion of the first friction material and the radially inner half portion of each of the internally toothed discs corresponding to the radially outer half portion of the first friction material are made as thin as possible irrespective of the strength of the teeth, whereby the axial length of the friction engaging device can be reduced. Thus, the friction engaging device can be made smaller in size and lighter in weight without deteriorating the strength of the teeth of the respective discs.

Additionally, according to a second aspect of the invention, there is provided a friction engaging device as set forth the first aspect, wherein one side of each of the internally toothed discs in the axial direction and the other side of each of the externally toothed discs in the axial direction which is located contiguously to the one side of each of the internally toothed discs in the axial direction are formed into a flat plane, wherein second friction materials interposed between the externally toothed discs and the internally toothed discs are each divided into a radially outer half portion and a radially inner half portion and wherein the radially inner half portion of the second friction material is attached to one of the externally and internally toothed discs to which the radially inner half portion of the first friction material is not attached, whereas the radially outer half portion of the second friction material is attached to one of the externally and internally toothed discs to which the radially outer half portion of the first friction material is not attached. This construction provides substantially a friction engaging device of the single-side application type, and is advantageous in attempting to make the size of the device smaller.

DECRIPTION OF THE PREFERRED EMBODIMENT

Figure 1:
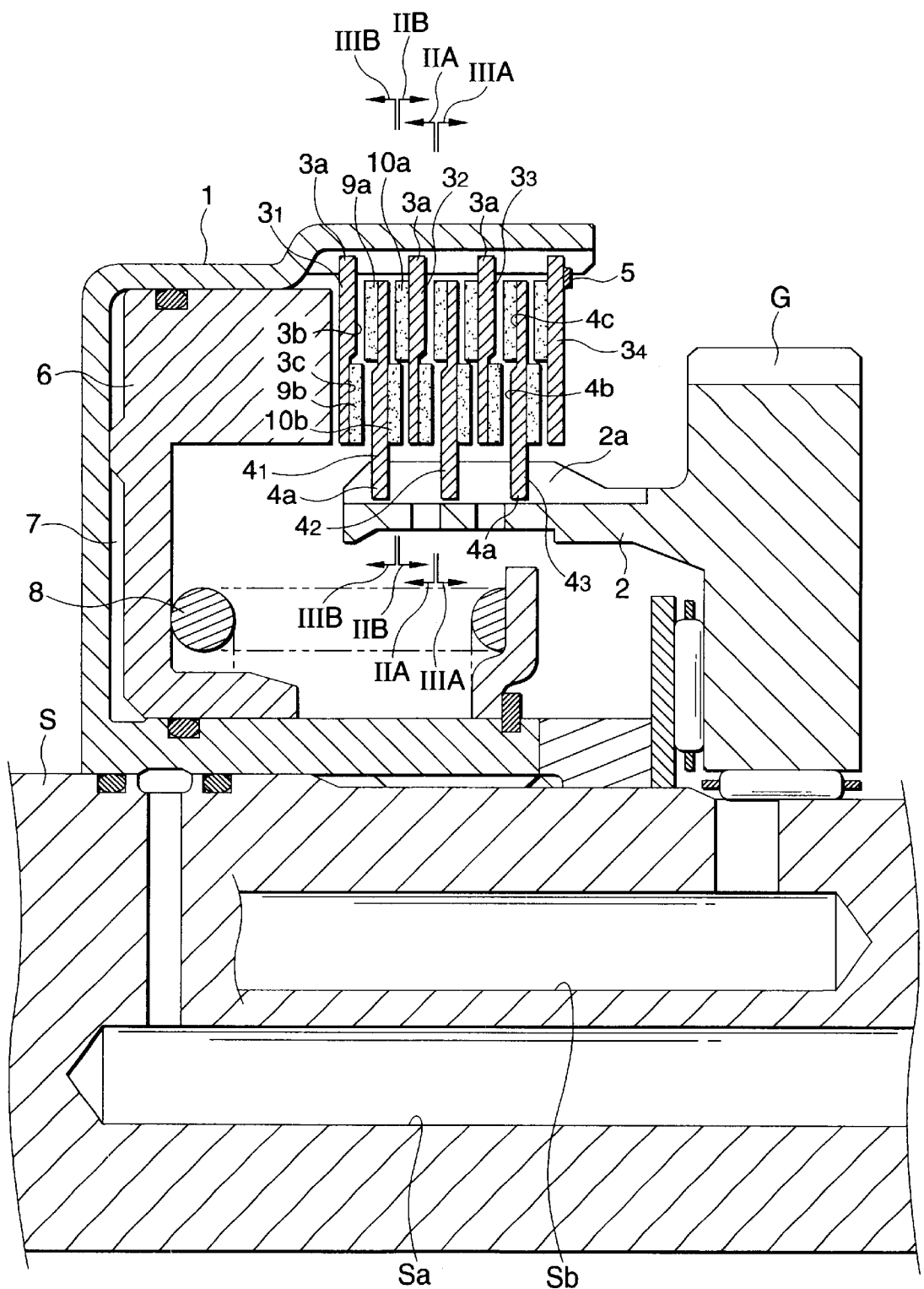
FIG. 1 is a sectional view of a hydraulic clutch to which the present invention is applied.

FIG. 1 shows a hydraulic clutch for an automotive automatic transmission which is a friction engaging device. This hydraulic clutch comprises a clutch drum 1 as an outer member which is connected to a power transfer shaft S, a hub 2 as an inner member which is integrally formed on a speed-change gear G rotatably supported on the power transfer shaft S, first to fourth four externally toothed discs $3_1, 3_2, 3_3, 3_4$ which are spline engaged with a splined portion 1a formed on the clutch drum 1 at external teeth 3a and first to third three internally toothed discs $4_1, 4_2, 4_3$ which are spline engaged with a splined portion formed on the hub 2 at inner circumferential teeth 4a. Assuming that a direction in which the clutch drum 1 opens is regarded as an axially outward direction, these externally toothed discs $3_1$ to $3_4$ and internally toothed discs $4_1$ to $4_3$ are disposed sequentially from an axially inward position in the following order; first externally toothed disc $3_1$, first internally toothed disc $4_1$, second externally toothed disc $3_2$, second internally toothed disc $4_2$, third externally toothed disc $3_3$, third internally toothed disc $4_3$, and fourth externally toothed disc $3_4$, and the fourth externally toothed disc 34 is prevented by a circlip or a snap ring 5 from being disengaged from the clutch drum 1. A piston 6 is provided in the clutch drum 1 which is adapted to be brought into abutment with the first externally toothed disc 31 from axially inwardly, and when pressurized fluid is supplied into a hydraulic chamber 7 formed between the piston 6 and an end wall of the clutch drum 1 via a fluid path Sa formed in the power transfer shaft S, the piston 6 moves axially outwardly against the biasing force a return spring 8, and the externally toothed discs $3_1$ to $3_4$ and internally toothed discs $4_1$ to $4_3$ are brought into press contact with each other in the axial direction via friction materials, whereby a torque is transferred between the clutch drum 1 and the hub 2. Note that a lubricating oil is supplied to the portions where the externally toothed discs $3_1$ to $3_4$ and internally toothed discs $4_1$ to $4_3$ are disposed from an oil path Sb formed in the power transfer shaft S.

Figure 2A:
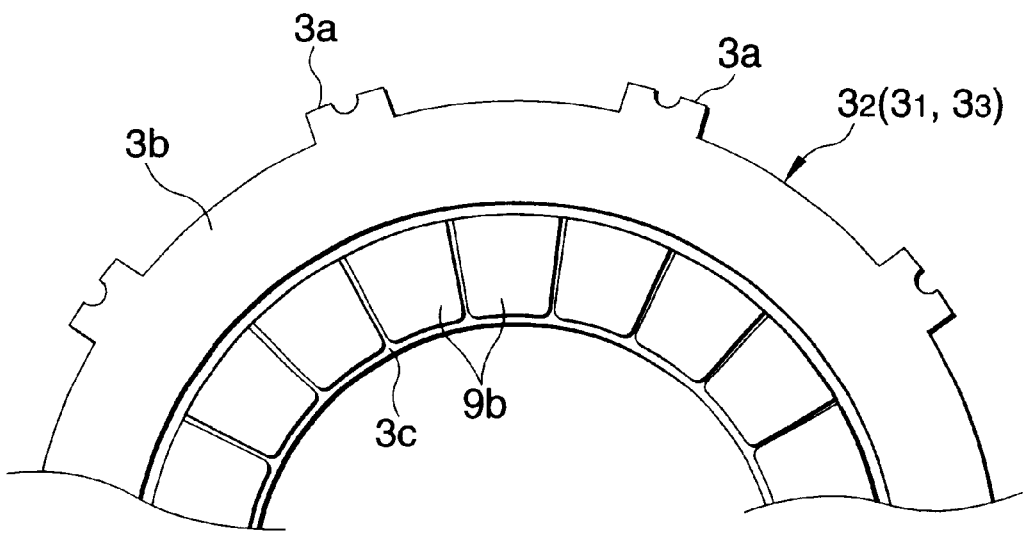
FIG. 2A is a sectional front view of an externally toothed disc as viewed from the line IIA—IIA of FIG. 1.
Figure 3A:
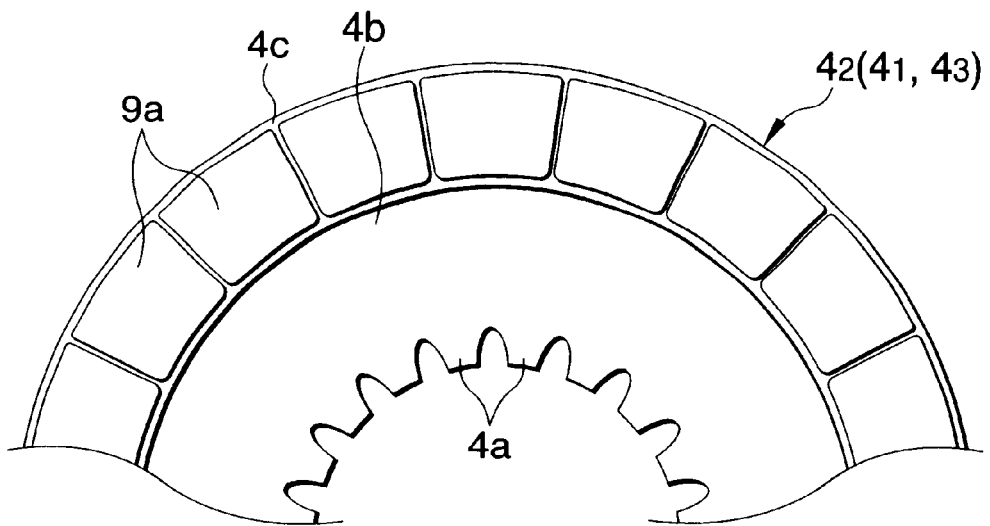
FIG. 3A is a sectional front view of an internally toothed disc as viewed from the line IIIA—IIIA of FIG. 1.

An axially external face of each of the first to third externally toothed discs $3_1, 3_2, 3_3$ is formed into a stepped surface having a radially outer raised surface portion 3b and a radially inner recessed surface portion 3c by making an radially inner half portion of each of the first to third discs $3_1, 3_2, 3_3$ thinner than a radially outer half portion thereof. Moreover, an axially internal face of each of the first to third internally toothed discs $4_1, 4_2, 4_3$ which are located contiguously to the axially external side of the first to third externally toothed discs $3_1, 3_2, 3_3$ is also formed into a stepped surface having a radially inner raised surface portion 4b and a radially outer recessed surface portion 4c by making an radially outer half portion of each of the first to third discs $4_1, 4_2, 4_3$ thinner than a radially inner half portion thereof. Then, the first friction materials interposed, respectively, between the first externally toothed disc $3_1$ and the first internally toothed disc $4_1$, the second externally toothed disc $3_2$ and the second internally toothed disc $4_2$, and the third externally toothed disc $3_3$ and the third internally toothed disc $4_3$ are each divided into a radially outer half portion 9a and a radially inner half portion 9b, and as shown in FIG. 2A, the radially inner half portion 9b is attached to the recessed surface portion 3c on the axially external face of each of the first to third externally toothed discs $3_1, 3_2, 3_3$, whereas as shown in FIG. 3A, the radially outer half portion 9a is attached to the recessed portion 4c on the axially internal face of each of the first to third internally toothed discs $4_1, 4_2, 4_3$.

Figure 2B:
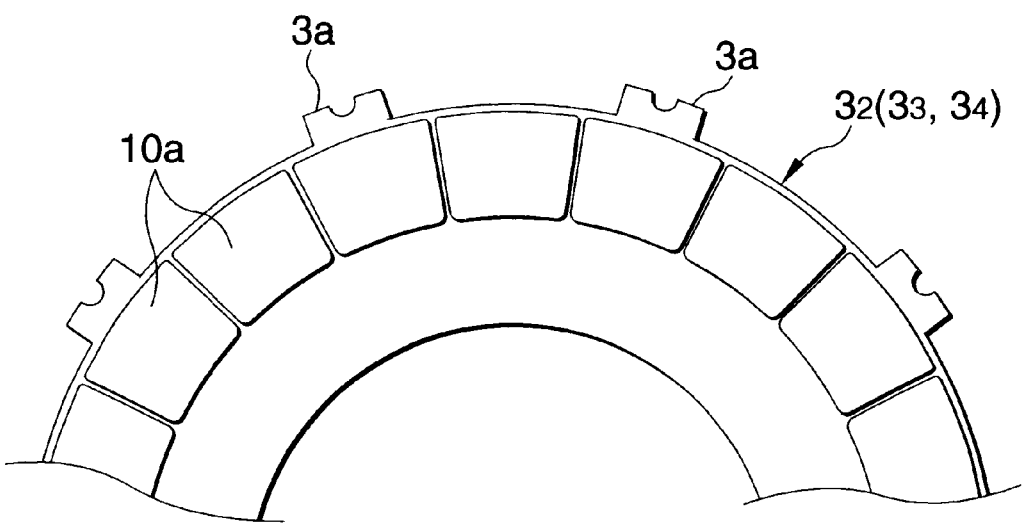
FIG. 2B is a sectional front view of the externally toothed disc as viewed from the line IIB—IIB of FIG. 1.
Figure 3B:
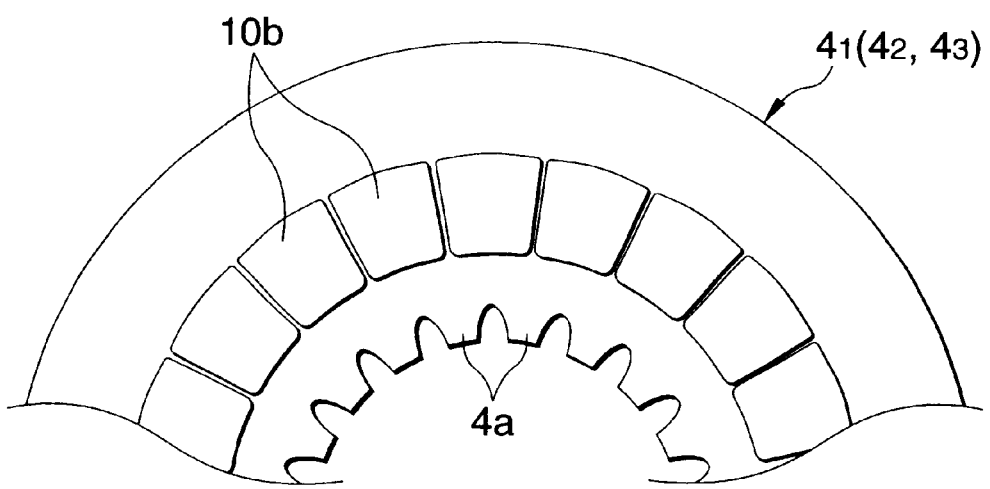
FIG. 3B is a sectional front view of the internally toothed disc as viewed from the line IIIB—IIIB of FIG. 1.

Additionally, the axially external faces of the first to third internally toothed discs $4_1, 4_2, 4_3$ and axially internal faces of the second to fourth externally toothed discs $3_2, 3_3, 3_4$ which are located contiguously to the axially external side of the first to the third internally toothed discs $4_1, 4_2, 4_3$ are formed into flat planes, respectively. Then, the second friction materials interposed, respectively, between the first internally toothed disc $4_1$ and the second externally toothed disc $3_2$, the second internally toothed disc $4_2$ and the third externally toothed disc $3_3$ and the third internally toothed disc $4_3$ and the fourth externally toothed disc $3_4$ are each divided into a radially outer half portion 10a and a radially inner half portion 10b, and as shown in FIG. 2B, the radially outer half portion 10a is attached to the axially internal face of each of the second to fourth externally toothed discs $3_2, 3_3, 3_4$ whereas as shown in FIG. 3B, the radially inner half portion 10b is attached to the axially external face of each of the first to third internally toothed discs $4_1, 4_2, 4_3$.

According to the above construction, on the radially inner side, the friction materials are attached to the axially external faces of the respective externally toothed discs $3_1, 3_3, 3_3$ and the respective internally toothed discs $4_1, 4_2, 4_3$, and on the other hand, on the radially outer side, the friction materials are attached to the axially internal faces of the respective externally toothed discs $3_2, 3_3, 3_4$ and the respective internally toothed discs $4_1, 4_2, 4_3$, this providing substantially the single-side application construction. Then, the radially inner half portions of the respective externally toothed discs $3_1, 3_3, 3_3$ coinciding with the radially inner half portions 9b of the first friction materials and the radially outer half portions of the respective internally toothed discs $4_1, 4_2, 4_3$ coinciding with the radially outer half portions 9a of the first friction materials are made thinner, thereby making it possible to reduce the axial length of the hydraulic clutch. Moreover, since the radially outer half portions of the respective externally toothed discs $3_1$, $3_3$, $3_3$ and the radially inner half portions of the respective internally toothed discs $4_1$, $4_2$, $4_3$ are not made thinner, the strength of the outer circumferential teeth $3a$ of the respective externally toothed discs $3_1$, $3_3$, $3_3$ and the inner circumferential teeth $4a$ of the respective internally toothed discs $4_1$, $4_2$, $4_3$ can be secured.

Note that it is possible to attach the radially outer half portions $9a$ and the radially inner half portions $9b$ of the first friction materials to the raised surfaces $3b$ on the externally toothed discs $3_1$, $3_3$, $3_3$ and the raised surfaces $4b$ on the internally toothed discs $4_1$, $4_2$, $4_3$, respectively, in which case, the radially half portions $10a$ of the second friction materials are attached to the respective internally toothed discs $4_1$, $4_2$, $4_3$, and the radially inner half portions $10b$ of the respective externally toothed discs $3_1$, $3_3$, $3_3$, this providing substantially the single-side application construction.

Thus, while the embodiment has been described heretofore in which the invention is applied to the hydraulic clutch, the invention may be equally applied to other friction engaging devices such as a hydraulic brake or a mechanical friction clutch.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As is clear from what has been described heretofore, according to the invention, the axial length of the friction engaging device can be reduced without deteriorating the strength of the teeth of the externally toothed discs and internally toothed discs, whereby it is possible to make the friction engaging device smaller in size and lighter in weight.

What is claimed is:

1. A friction engaging device comprising:

externally toothed discs each having outer circumferential teeth adapted to be spline engaged with an outer member and;

internally toothed discs each having inner circumferential teeth adapted to be spline engaged with an inner member; and friction materials through which said externally toothed discs and said internally toothed discs are brought into axial press contact with each other for performing the transfer of a torque between said outer member and said inner member, wherein one side face of each of said externally toothed discs in an axial direction is formed into a stepped surface having a raised surface portion on a radially outer side of said disc and a recessed surface portion on a radially inner side thereof by making a radially inner half portion of each of said externally toothed discs thinner than a radially outer half portion thereof, wherein an other side face of each of said internally toothed discs in an axial direction which is located contiguously to said one side of each of said externally toothed discs in the axial direction is formed into a stepped surface having a raised surface portion on a radially inner side of said disc and a recessed surface portion on a radially outer side thereof by making a radially outer half portion of each of said internally toothed discs thinner than a radially inner side half portion thereof, wherein first friction material of said friction materials being interposed between said externally toothed discs and said internally toothed discs that are located contiguously to said one side of said externally toothed discs in the axial direction are each divided into a radially outer half portion and a radially inner half portion, said radially inner half portion of said first friction material being attached to said recessed surface portion on said one side of each of said externally toothed discs in the axial direction or said raised surface portion on the other side of each of said internally toothed discs in the axial direction, said radially outer half portion of said first friction material being attached to said recessed surface portion on the other side of each of said internally toothed discs in the axial direction or said raised surface portion on said one side of each of said externally toothed discs in the axial direction.

2. A friction engaging device as set forth in claim 1, wherein one side of each of said internally toothed discs in the axial direction and an other side of each of said externally toothed discs in the axial direction which is located contiguously to said one side of each of said internally toothed discs in the axial direction are formed into a flat plane, wherein second friction materials of said friction materials being interposed between said externally toothed discs and said internally toothed discs are each divided into a radially outer half portion and a radially inner half portion and wherein said radially inner half portion of said second friction material is attached to one of said externally and internally toothed discs to which said radially inner half portion of said first friction material is not attached, whereas said radially outer half portion of said second friction material is attached to one of said externally and internally toothed discs to which said radially outer half portion of said first friction material is not attached.

* * * * *